Feb. 14, 1950          G. E. ADAMS          2,497,252
DAMPENER
Filed Dec. 22, 1947                       2 Sheets-Sheet 2
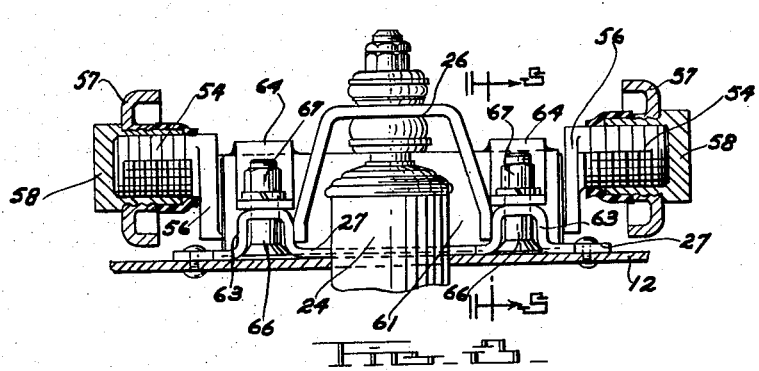
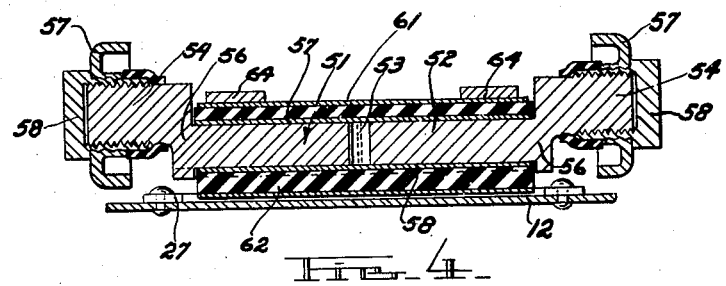
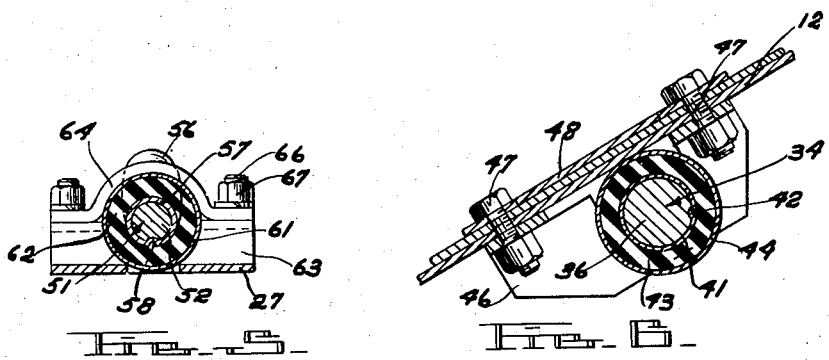
G. E. ADAMS
INVENTOR.
BY
ATTORNEYS Patented Feb. 14, 1950

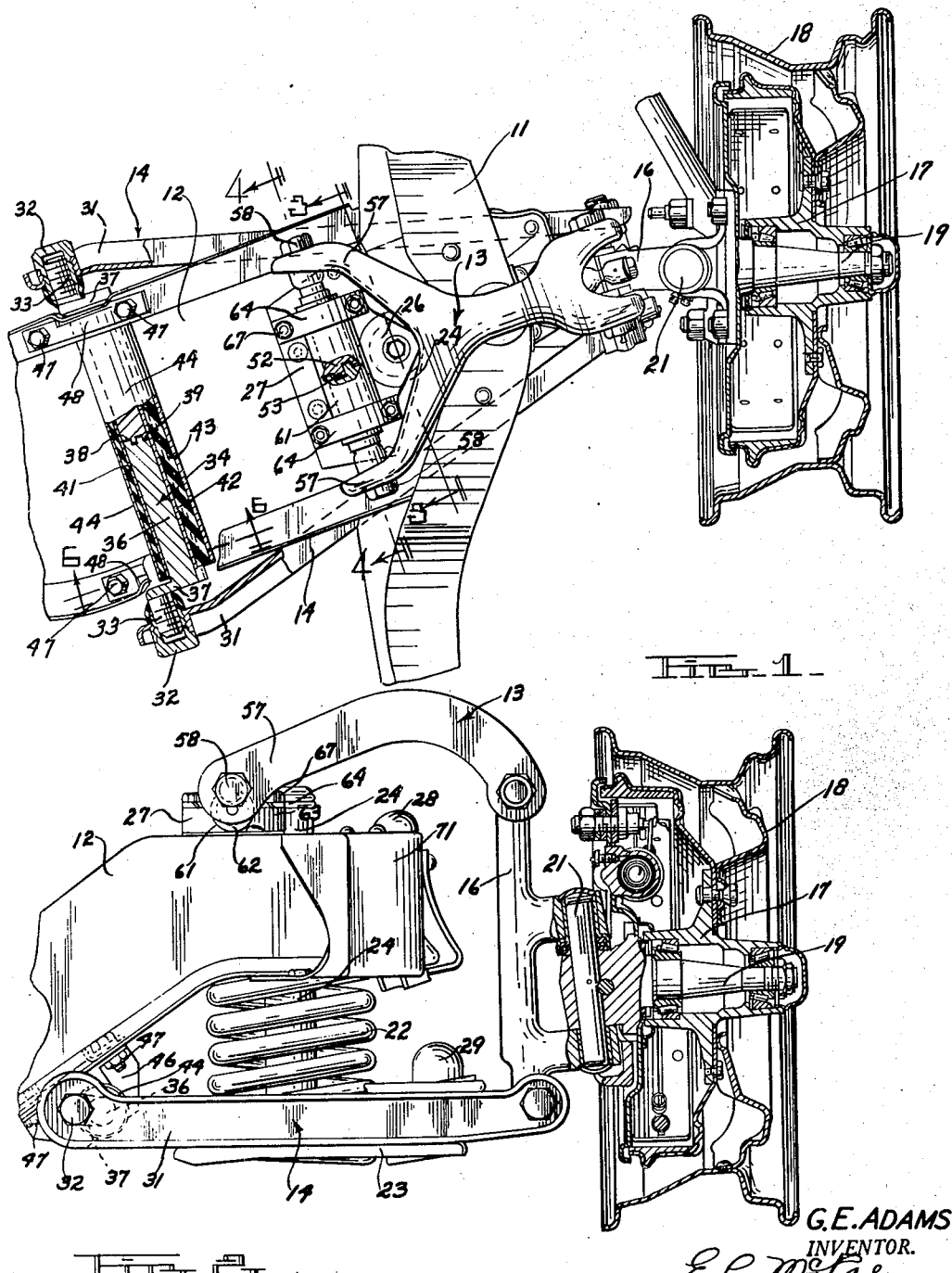

2,497,252

UNITED STATES PATENT OFFICE 2,497,252

DAMPENER

George E. Adams, Detroit, Mich., assignor to Ford Motor Company, Dearborn, Mich., a corporation of Delaware Application December 22, 1947, Serial No. 793,106

10 Claims. (Cl. 267—20)

This invention relates generally to dampeners and has particular reference to improved dampening means for utilizing the rubber in torsion.

An object of the present invention is to provide a dampening means in which generally linear deflections or vibrations are transmitted into angular movements and effectively dampened by a torsional rubber member. It is also an object of the invention to provide vibration dampening means in which a rubber insulating member is placed in torsion rather than in compression by means of force applied in an offset or eccentric manner to effectively prevent the transmission of vibration through the construction. The forces are applied through a lever arm of sufficient length to permit a relatively thin bushing to be used so as to minimize unwanted deflections in other directions.

Another object of the present invention is to provide a wheel suspension for automotive vehicles in which the road wheels are adequate insulated from the vehicle frame and the vehicle body so that road noises and vibrations are effectively dampened and are not transmitted to the vehicle frame or body, and yet in which the stability of the suspension is not sacrificed and excessive variations in wheel alignment characteristics during operation are eliminated.

Still another object is to enhance the riding characteristics of the vehicle by providing resilient means between the road wheels and the frame arranged to be most effective in the direction in which the major shock vibrations and deflections occur. A further object is to place this insulation means at the points of connection of the wheel suspension system to the frame so as to insulate the frame and body against all vibrations occurring either at the road wheels or at any point in the suspension system itself.

It has heretofore been proposed to use insulating means between the road wheels and the frame to absorb and dampen road vibration, but these have not been entirely satisfactory for several reasons. The majority of the means heretofore suggested used rubber in relatively large quantities as the insulating medium, with the rubber being placed in compression or sometimes in shear to absorb the vibrations. In order to accommodate adequate deflection in the rubber insulation it has been necessary to make the latter relatively thick and soft with a resultant sacrifice in the stability of the suspension system and the wheel alignment. Unwanted variations in camber, caster, and toe-in necessarily followed, often resulting in wheel shimmy and other undesirable characteristics.

The above-mentioned and other disadvantages are eliminated by the present construction, in which a relatively thin rubber bushing forms the insulation means between the road wheels and the frame, the bushing being placed in torsion rather than in compression as a result of road vibration and shock. Deflections of ample magnitude are thus obtained without providing a large mass of rubber, and consequently changes in the wheel alignment characteristics are extremely small and not detrimental. These advantages are achieved by utilizing mounting bars mounted upon the vehicle frame and having radially offset ends pivotally supporting the suspension arms. The torsion rubber bushings are placed between the mounting bars and the frame, and road vibrations and deflections are applied by the suspension arms of the offset end portions of the mounting bars. The forces thus act through lever arms and place the bushings in torsion, effectively dampening the vibrations. Similar arrangements are utilized at the points of connection between both the upper and lower suspension arms and the frame, and the directions in which the upper and lower mounting bars are offset is such that in each instant the major deflection forces are adequately absorbed and transmitted into torsion of the rubber bushing, while the minor variations are resisted by the bushings in compression.

Other objects and advantages of the present invention will be made more apparent as this description proceeds, particularly when considered in connection with the accompanied drawings, wherein:

Figure 1 is a plan view, partly broken away and in section, of a typical independent suspension system for the front road wheel of a vehicle, and embodying the present invention.

Figure 2 is a front elevation of the construction shown in Figure 1.

Figure 3 is an enlarged cross-sectional view taken substantially on the plane indicated by the line 3—3 of Figure 1.

Figure 4 is an enlarged cross-sectional view taken substantially on the plane 4—4 of Figure 1.

Figure 5 is a cross-sectional view taken substantially on the plane indicated by the line 5—5 of Figure 3.

Figure 6 is an enlarged cross-sectional view taken substantially on the plane indicated by the line 6—6 of Figure 1.

Referring now to the drawings, and particularly to Figures 1 and 2, there is shown the front portion of a vehicle frame and the independent suspension for one of the front steerable wheels of the vehicle. Inasmuch as the construction for the other front wheel is identical, it is not shown. The particular suspension system chosen for the purposes of illustration comprises generally a double wishbone type independent suspension similar to that now in wide commercial use, although it will be understood that the invention is applicable to other types of wheel suspensions as well and also to other constructions in which it is desirable to dampen vibration and deflection.

The reference character 11 indicates the left-hand side frame member of the vehicle and 12 the front cross frame member extending between the side frame members at opposite sides of the frame. Conventional upper and lower suspension links 13 and 14 respectively of the wishbone type are pivotally mounted upon the cross frame member 12 by means to be described more in detail hereinafter. The suspension links extend generally laterally outwardly from the frame and their outer ends are pivotally connected to the upper and lower ends of the vertical knuckle support arm 16. The hub 17 of the front road wheel 18 is journaled upon the wheel spindle 19, which in turn is pivotally connected to the knuckle support arm 16 by means of the kingpin 21.

It will be seen that the construction thus far described is conventional and that the suspension accommodates rising and falling movement of the front wheel independently of movement of the other wheels of the vehicle. A compression coil spring 22 resiliently supports the road wheel and is mounted between a spring pan 23 on the lower suspension link 14 and the upper portion of the inverted channel forming the front cross frame member 12. A shock absorber 24 of the tubular type extends concentrically within the coil spring 23 and is connected at its lower end to the spring pan 23 and its upper end to the inverted U-shaped bracket 26 secured to the bracket 27 which in turn is mounted upon the upper flange of the front cross frame member 12. Rubber bumpers 28 and 29 limit the downward and upward movement respectively of the suspension relative to the frame.

In the conventional type of independent suspension the upper and lower links are pivotally mounted at their inner ends upon threaded bearings formed at the outer ends of pivot bars bolted to the cross frame member. With this type of construction there exists a continuous metal-to-metal contact from the road wheels to the vehicle frame and body. Road shocks and vibrations are thus transmitted from the road wheels to the frame and in addition vibrations originating in the various joints of the suspension system are also productive of noises and vibrations which are transmitted undiminished to the vehicle frame and body. Thus it will be seen that the points of pivotal connection between the suspension links and the frame are advantageous points at which to provide adequate insulation against the transmission of such vibrations. The pivotal connection between the upper and lower links of the present invention are generally similar in construction, but since they differ somewhat both in construction and in operation they will be described separately.

As best seen in Figures 1, 2, and 6, the bifurcations or arms 31 of the lower wishbone suspension link 14 are formed with apertures adjacent their inward ends within which are assembled bushings 32. The bushings 32 are internally threaded and receive the threaded ends 33 of the lower mounting bar 34. The center portion 36 of the mounting bar 34 is cylindrical, and the threaded ends 33 are offset in a radial direction from the axis of the center portion 36. Radially extending flanges or crank arms 37 connect the center portion with the ends of the bar.

The center portion 36 of the mounting bar 34 is centrally split at 38 to form two sections joined together by interlocking tongues 39. The two sections of the mounting bars thus function as a single bar, being split only for ease of assembly within the sleeves and bushings hereinafter described. The two sections of the central portion 36 of the bar are pressed into a sleeve 41, the latter being formed with an axially extending rib 42 seated within a corresponding groove in the bar to prevent turning of the two sections of the bar and the sleeve relative to each other.

A rubber bushing or sleeve 43 surrounds the sleeve 41 and is preferably bonded thereto. It will be noted that the rubber bushing 43 is provided with an axially extending rib fitting within the corresponding groove formed by the rib 42 of the inner sleeve 41. Surrounding the rubber bushing 43 is a second and larger metal sleeve 44 also preferably bonded to the rubber bushing 43. The inner and outer sleeves 41 and 44 respectively and the rubber bushing 43 extend substantially the entire width of the front cross frame member 12, and the outer sleeve 44 is rigidly mounted upon the frame member by means of brackets 46, one bracket being provided at each end of the outer sleeve and welded thereto. The brackets 46 are located beneath the outer flanges of the cross frame member 12 and are secured thereto by bolts 47 which extend through the brackets, frame member, and reinforcing plates 48 provided adjacent the upper surface of the frame member flange.

From the foregoing it will be seen that the central portion 36 of the mounting bar, the inner and outer sleeves 41 and 44, and the rubber bushing 43 are concentric and provide a torsional pivotal mounting. Normal rising and falling movement of the road wheel is accommodated, however, by the threaded bearings formed between the end portions 33 of the mounting bar and the arms 31 of the lower suspension link, and such movements normally do not result in rotation of the mounting bar about its axis. The torsional pivotal mounting for the center portion of the mounting bar is designed to absorb and dampen the major portion of the road shocks and vibrations transmitted from the road wheels to the lower suspension link to the frame. It will be noted that the end portions 33 of the mounting bar are offset in a generally horizontal manner from the center portion 36 of the bar. The major loads acting upon the road wheel and through the knuckle arm and suspension link are such as to result in vertical forces being exerted by the inner end of the lower suspension link at its point of connection with the vehicle frame. With the axis of the threaded end 33 of the mounting bar being offset generally horizontally from the axis of the central portion 36 of the bar, these vertical forces act through the crank arm formed by the flange 37 to apply torque to the mounting bar tending to rotate the bar within its pivotal mounting. Inasmuch as the inner sleeve 41 necessarily rotates with the central portion 36 of the mounting bar due to the interlocking connection formed therebetween by the rib 42 on the sleeve, the rubber bushing 43 which is bonded between the inner and outer sleeves 41 and 44 is subjected to torsion. The forces impressed upon the inner end of the lower suspension link in generally vertical directions are thus effectively absorbed and dampened by the rubber bushing 43 in torsion. The amount of torsion applied to the bushing from these forces is determined by the amount of offset of the end portions of the bar, and by varying this lever arm the required amount of dampening can be obtained for any particular suspension.

From the foregoing it will be seen that the major portion of the vibrations resulting from the road wheel are effectively dampened by placing the rubber bushing in torsion. In addition, the rubber bushing provides a complete insulation between the road wheel and the suspension system on the one hand and the vehicle frame and body on the other hand, thus tending to dampen other minor vibrations. Inasmuch as the rubber bushing is relatively thin, however, it permits only relatively small deflections in compression in radial directions or in shear in a longitudinal or axial direction. Consequently, the suspension is stable, and undesirable deflections and variations in the camber, caster, and toe-in of the road wheel are prevented. Proper wheel alignment is thus maintained at all times and wheel shimmy and other objectionable characteristics often found in insulated suspension systems are obviated.

Reference will now be had to the pivotal mounting for the inner end of the upper suspension links 13. This construction is generally quite similar to that of the pivotal mounting for the lower suspension link and includes an upper mounting bar 51 having a central portion 52 centrally split and formed with interlocking tongues 53, and with radially offset end portions 54 which are externally threaded. The end portions 54 are connected with the central portion of the mounting bar by means of radially extending flanges or crank arms 56.

The upper suspension link 13 is bifurcated to form longitudinally spaced arms 57 provided with apertures at their inner ends within which are assembled internally threaded bushings 58 threadedly receiving the threaded bearings formed upon the offset end portions 54 of the mounting bar. The upper suspension link is thus mounted for pivotal movement relative to the mounting bar and the normal rising and falling movements of the road wheel are accommodated without rotating the mounting bar 51 itself.

The two interlocked sections of the central portion 52 of the mounting bar 51 are assembled within an inner sleeve 57 and interlocked with the sleeve by means of an axially extending rib 58 formed on the sleeve and engaging a corresponding groove in the bar. The two sections of the mounting bar and the inner sleeve thus rotate together as a unit. A larger outer sleeve 61 is arranged concentrically with the inner sleeve 57, and a rubber bushing 62 is placed therebetween and bonded to the inner and outer sleeves respectively.

The previously mentioned bracket 27 is riveted to the upper surface of the cross frame member 12 and is formed with integral yokes 63 for receiving and supporting the outer sleeve 61 of the upper pivotal mounting. The yokes 63 are of inverted channel shaped cross section when viewed from the side of the car, and are semicircular in shape when viewed from the front of the car to form saddles partially embracing the sleeve 61. The yokes are longitudinally spaced and receive opposite ends of the outer sleeve 61, and caps 64 of semicircular shape embrace the upper portion of the sleeve 61 and co-operate with the yokes 63 to clamp the sleeve to the frame. Bolts 66 have their heads seated within the channel shaped portions of the yokes 63 and are preferably welded therein. The bolts extend through the caps 64 and are provided with nuts 67 which are tightened to clamp the sleeves. The previously mentioned bracket 26, supporting the upper end of the shock absorber 24, is of inverted U-shape and has its outer flanges welded to the yokes 63.

From the foregoing it will be noted that there is thus provided a torsional pivotal mounting for the upper mounting bar 51. It will also be noted that the end portions 54 of the mounting bar are offset from the central portion 52 of the bar in a vertical direction, as distinguished from the horizontal offset at the lower pivotal mounting. The type of suspension shown is such as to result in generally horizontal deflections and forces being applied by the upper suspension link 13 to the upper pivotal mounting as the result of road shocks and vibrations transmitted through the road wheels. By extending the crank arm 56 in a generally vertical direction, these horizontal deflections result in applying torsional forces to the central portion of the mounting bar 52 and these torsional forces are resisted by the rubber bushing 62 in torsion rather than in compression. Here again, the bushings may be relatively thin since the offset end portions provide lever arms of sufficient length to effectively dampen the major portion of the vibrations in torsion. Since the amount of rubber can thus be maintained at a minimum, deflection in compression and shear is relatively small and wheel alignment characteristics are maintained in a stable manner.

The bushings 43 and 62 are referred to in the specification and in the claims as being formed of rubber, but it will be understood that this term is intended to refer not only to natural rubber but also to synthetic rubber materials and other yieldable resilient materials of this character.

It is within the contemplation of this invention to utilize the dampening means of the invention at other points in the suspension as well as at the points of pivotal connection between the suspension arms and the frame. In addition, it may be utilized to advantage in connection with other types of wheel suspensions and, in fact, as a dampening means in any type of mechanism in which it is desired to absorb and dampen vibration and prevent its transmission through the mechanism while at the same time maintaining stability between the dampened and undampened parts of the structure. The construction, for example, is adapted for use as a resilient engine mounting, and for many other uses as well. Thus the principle of using an offset crank arm to transmit vibration and shock forces to a rubber bushing which dampens and absorbs the vibration in torsion rather than in shear or compression, has many applications.

Although I have shown and described certain embodiments of the invention, it will be understood that I do not wish to be limited to the exact construction shown and described, but that various changes and modifications may be made without departing from the spirit and scope of my invention, as defined in the appended claims.

What is claimed is:

1. In an independent suspension for a vehicle road wheel, a frame member, a sleeve rigidly mounted upon said frame member, a rubber bushing within said sleeve and bonded thereto, a shaft extending through said bushing and bonded thereto, said shaft having end portions extending beyond the opposite ends of said bushing and provided with radially offset crank arms, a wishbone link pivotally mounted upon the offset crank arms, and a wheel supporting member connected to said link, said link being swingable about said offset crank arms to accommodate rising and falling movement of said road wheel, and said shaft being rotatable in response to forces imposed upon said crank arms to place a torsional load upon said bushing.

2. In an independent suspension for a vehicle road wheel, a frame, a wheel supporting member, upper and lower links extending generally laterally outwardly from said frame and pivotally connected at their outer end to the upper and lower ends respectively of said wheel supporting member to accommodate rising and falling movement of said road wheel relative to said frame, upper and lower mounting bars carried by said frame and having offset end portions upon which the inner ends of said upper and lower links respectively are journaled, and yieldable rubber members insulating said mounting bars from said frame.

3. The structure defined by claim 2 which is further characterized in that said insulating rubber members comprise torsional bushings embracing said mounting bars, and supporting members secured to said frame and embracing said rubber bushings.

4. The structure defined by claim 2 which is further characterized in that the offset end portions of said upper and lower mounting bars are offset from said mounting bars in directions extending substantially at right angles to the directions of the major forces applied by said upper and lower links respectively at their points of connection to said frame.

5. The structure defined by claim 2 which is further characterized in that the offset end portions of said mounting bars are integrally formed therewith and each of said bars is split intermediate its ends to form two sections which are interlocked together to insure rotation as a unit, a rubber bushing surrounding the split sections of each of said mounting bars, and a metal sleeve surrounding each of said rubber bushings and rigidly supported upon said frame, said rubber bushings being bonded to said mounting arms and said outer sleeves so as to be placed under torsional load upon angular movement of the offset ends of said mounting bars.

6. In an independent suspension for a vehicle road wheel, a frame member, a wheel supporting member, upper and lower laterally extending links pivotally connected at their outer ends to the upper and lower ends respectively of said wheel supporting member, upper and lower mounting bars carried by said frame member and having radially offset crank arms at their extremities upon which the inner ends of said upper and lower links are journaled, yieldable rubber bushings insulating the upper and lower bars from said frame, said bushings having their inner and outer surfaces respectively connected to said mounting bars and said frame member, the crank arms for said upper mounting bar being radially offset in a generally vertical direction with respect to the axis of the body of said upper mounting bar and said upper rubber bushing, and the crank arms for said lower mounting bar being offset radially in a generally horizontal direction from the axis of the body portion of said lower mounting bar and said lower rubber bushing.

7. In an independent suspension for a vehicle road wheel, a frame member, a shaft, a rubber torsion member supporting said shaft upon said frame member, a radially offset crank arm upon said shaft, a suspension link pivotally mounted upon said offset crank arm and a wheel supporting member connected to said suspension link, said link being swingable about said offset crank arm to accommodate rising and falling movement of said road wheel, and said shaft being rotatable in response to forces imposed upon said crank arm to place a torsional load upon said rubber torsion member.

8. In an independent suspension for a vehicle road wheel, a frame member, a shaft, a rubber bushing embracing said shaft, means supporting said rubber bushing upon said frame member, said shaft having end portions extending beyond the opposite ends of said bushing and provided with radially offset crank arms, a wishbone link pivotally mounted upon said offset crank arms and a wheel supporting member connected to said link, said link being swingable about said offset crank arm to accommodate rising and falling movement of said road wheel, and said shaft being rotatable in response to forces imposed upon said crank arms to place a torsional load upon said bushing.

9. In an independent suspension for a vehicle road wheel, a frame, a wheel supporting member, a suspension link extending outwardly from said frame and pivotally connected at its outer end to said wheel supporting member to accommodate rising and falling movement of said road wheel relative to said frame, a mounting bar carried by said frame and having an offset end portion upon which the inner end of said suspension link is journaled, and a yieldable rubber member insulating said mounting bar from said frame.

10. In a dampening device for a vehicle suspension mounting, a frame member, a wheel supporting member, a suspension link connected at one end to said wheel supporting member, a bar provided with a crank arm radially offset from the axis of the body of said bar, a rubber torsional member connecting the body of said bar to said frame member, and a pivotal connection between said suspension link and the crank arm of said bar to mount said suspension link for free swinging movement about the offset axis of said crank arm to accommodate rising and falling movement of said wheel supporting member, the body of said bar being rotatable about its axis against the resistance of said rubber torsion member only in response to forces impressed upon the crank arm of said bar other than the normal rising and falling movement of the wheel supporting member.

GEORGE E. ADAMS.

REFERENCES CITED

The following references are of record in the file of this patent:

UNITED STATES PATENTS

| Number | Name | Date |
|---|---|---|
| 1,720,432 | Pampinella | July 9, 1929 |
| 1,804,958 | Stebbins | May 12, 1931 |
| 2,100,338 | Knox | Nov. 30, 1937 |
| 2,188,952 | Leighton | Feb. 6, 1940 |
| 2,268,438 | Beebe | Dec. 30, 1941 |
| 2,339,533 | Wahlberg et al. | Jan. 18, 1944 |
| 2,351,651 | Wulff | June 20, 1944 |

FOREIGN PATENTS

| Number | Country | Date |
|---|---|---|
| 211,064 | Switzerland | Nov. 1, 1940 |